(12) United States Patent
Henkel et al.

(10) Patent No.: US 6,587,595 B1
(45) Date of Patent: Jul. 1, 2003

(54) METHOD FOR THE IMAGE OPTIMIZATION OF AN X-RAY IMAGE

(75) Inventors: Rainer Henkel, Schweppenhausen (DE); Knut Beneke, Ober-Olm (DE)

(73) Assignee: Heimann Systems GmbH, Wiesbaden (DE)

( * ) Notice: Subject to any disclaimer, the term of this patent is extended or adjusted under 35 U.S.C. 154(b) by 0 days.

(21) Appl. No.: 09/379,100

(22) Filed: Aug. 23, 1999

(30) Foreign Application Priority Data

Nov. 30, 1998 (DE) .......................... 198 55 250

(51) Int. Cl.$^7$ ................................. G06T 5/00
(52) U.S. Cl. ........................ 382/274; 382/282
(58) Field of Search ..................... 382/274, 254, 382/282, 132; 358/447, 461, 453, 464

(56) References Cited

U.S. PATENT DOCUMENTS 5,644,650 A    7/1997   Suzuki et al. ................ 382/274

FOREIGN PATENT DOCUMENTS

| DE | 195 08 690 | 9/1996 | |
|----|-----------|--------|---|
| DE | 197 30 512 | 8/1998 | |
| EP | 1074939 A1 | 2/2001 | ............. G06T/5/40 |
| GB | 2 289 981 | 12/1995 | |
| WO | 96/13805 | 5/1996 | |
| WO | 97/39575 | 10/1997 | |

OTHER PUBLICATIONS

Hoyer et al, "Bildverbesserung durch digitale Nach–verarbeitung", Philips techn. Rdsch. 38, 1979, No. 11/12. pp. 311–323.

Ernst, "Einführung in die digitale Bildverarbeitung", Franzis Einführung, 1991, pp. 113–118, 225, 226.

*Primary Examiner*—Scott Rogers
(74) *Attorney, Agent, or Firm*—Venable LLP; Norman N. Kunitz

(57) ABSTRACT

A method of optimizing an X-ray image representing an article transilluminated by X-rays, includes the following steps: detecting the X-rays leaving the article after transillumination thereof by the X-rays; processing, in a computer, the detected X-rays as image dots to obtain an image; applying the image dots to an image memory; scanning the image dots according to gray scale values thereof; comparing the scanned gray scale values with a desired threshold gray scale value; upon finding an image dot which is other than the desired threshold gray scale value, counting subsequent image dots to obtain an image zone A; determining the gray scale values of the image dots of the image zone A; and expanding the gray scale values of the image dots of the image zone A to higher image dot values for effecting a local brightening of the X-ray image in the image zone A by the higher image dot values.

11 Claims, 3 Drawing Sheets

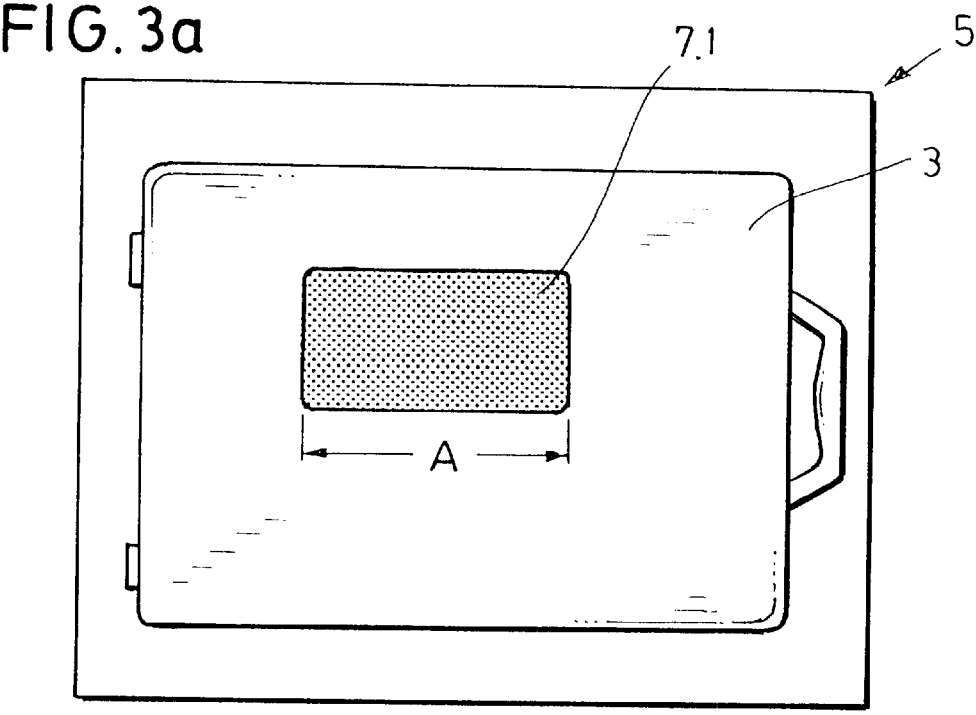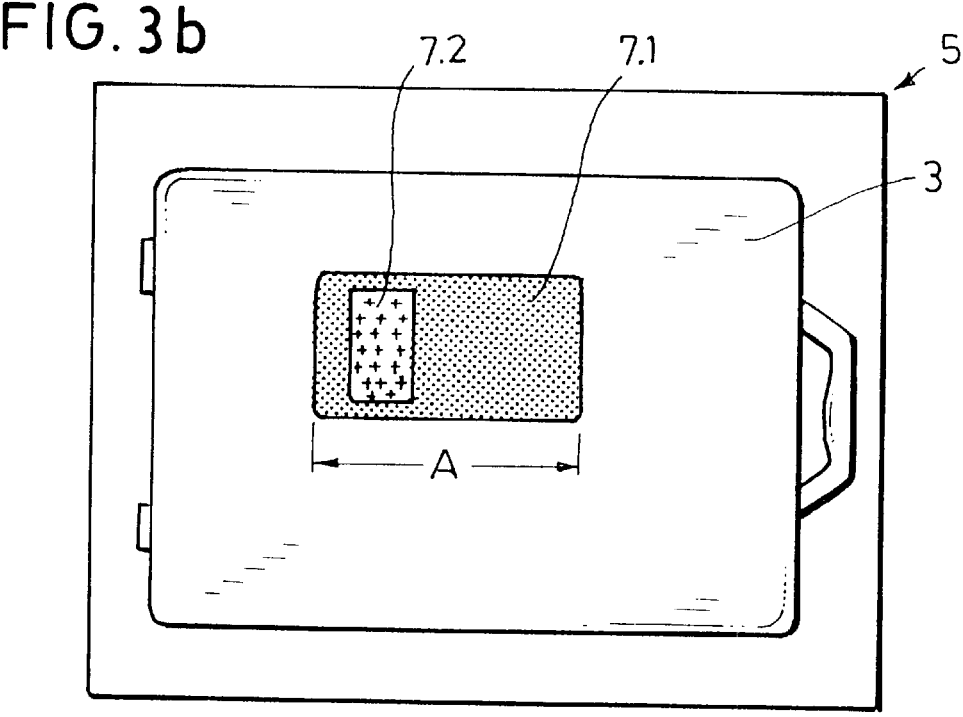

METHOD FOR THE IMAGE OPTIMIZATION OF AN X-RAY IMAGE

CROSS REFERENCE TO RELATED APPLICATION

This application claims the priority of German Application No. 198 55 250.5 filed Nov. 30, 1998, which is incorporated herein by reference.

BACKGROUND OF THE INVENTION

The invention relates to a method for the image optimization of an X-ray image which is formed by X-rays after transilluminating an object. The X-rays exiting the object are detected and are processed in a computer as image data to form an image. The computer has an image memory. The image data are formed of image dots which are applied to the image memory.

Thus, objects are transilluminated by X-rays and the Xray image is made visible for an operator. As a rule, the transilluminated object (such as a piece of luggage) contains further items.

Upon transillumination of the items the X-rays are non-uniformly weakened, and the weakened radiation is made visible by suitable devices on monitors. The X-ray images are composed of image dots having various properties such as gray scale value and material value.

An image processing method for material recognition is described in German Application No. 198 12 055.9 filed Mar. 19, 1998. In that method signals detected during a partial illumination of a piece of luggage are subdivided as image data into image strips, are scanned and briefly stored. In such a procedure frequently dark regions appear in the image strips. Therefore, such dark regions of the X-ray image are visually evaluated in a known manner by an operator for which various optimizing functions are selected by manual actuation. Such a proceeding is time-consuming and is particularly undesired in case the transmillumination of hand luggage is performed, for example, at airports.

German Offenlegungsschrift (application published without examination) 43 30 787 describes a method for operating X-ray illuminating automats. The method disclosed therein provides for an automatic selection of measuring fields. A first image computer calculates the gray scale distribution of a test image to superpose the gray scale values on a principal image which is subsequently produced. The purpose is to obtain an optimal illumination within the gray scale ranges. Such a use of a test image is excessively time-consuming in case of transilluminating pieces of luggage.

German Offenlegungsschrift 44 09 790 discloses a method and an apparatus for a dynamic compression of multi-stage gray scale images. The input image values which lie under a selectable, approximately average signal threshold are inverted. The image values which are recognized as absolute values above such a signal threshold are retained. The result of such a conversion of the input image values is an intarsia-like positive/negative image with a closed line clearly characterizing the monotony jump of the gray scale value representation and with an extra halved dynamic circumference. This process is used with preference in mammography. Such a process, however, cannot be used for evaluating a plurality of transilluminated material in a piece of luggage.

SUMMARY OF THE INVENTION

It is an object of the invention to provide an improved method for the image optimization of X-ray images which automatically and optimally reproduces regions which are difficult to identify and thus minimizes the time needed for such an identification.

This object and others to become apparent as the specification progresses, are accomplished by the invention, according to which, briefly stated, the method of optimizing an X-ray image representing an article transilluminated by X-rays, includes the following steps: detecting the X-rays leaving the article after transillumination thereof by the X-rays; processing, in a computer, the detected X-rays as image dots to obtain an image; applying the image dots to an image memory; scanning the image dots according to gray scale values thereof; comparing the scanned gray scale values with a desired threshold gray scale value; upon finding an image dot which is other than the desired threshold gray scale value, counting subsequent image dots to obtain an image zone A; determining the gray scale values of the image dots of the image zone A; and expanding the gray scale values of the image dots of the image zone A to higher image dot values for effecting a local brightening of the X-ray image in the image zone A by the higher image dot values.

The invention is based on the principle to automatically determine regions of the X-ray image that are difficult to identify, for example, dark regions, and to locally brighten such regions. The dark regions are reproduced brightened on a monitor without brightening the other lighter ranges at the same time. The local brightening of the dark regions is effected by expanding the gray scale values of the image dots which form the X-ray image. By brightening the dark ranges hidden objects may be detected.

The optimized process is involved in the image evaluation only at a time when a detected gray scale value falls below a threshold value or is equal to or greater than such threshold value and if a certain number of image points are determined which directly adjoin one another. It is, however, taken into consideration that, for example, excessively small zones should not cause a brightening or image optimization because in this manner the obtained X-ray image would be too crowded.

It is a further possibility to utilize, for the determination of the number of image points, not only directly adjoining image points which fall below a predetermined gray scale threshold, but also image points which fall below a certain gray scale threshold and are not immediately adjoining; that is, they may be separated by two or three image points which lie above the gray scale threshold. In this manner blurred zones too may be detected in case they contain a number of bright image dots.

It is a further possibility to examine only every third or fourth image dot as to whether or not its gray scale value exceeds the threshold. If the gray scale value of the third image dot falls below the threshold and thus is of identical magnitude as the previously evaluated image dot gray scale value, a summation of the omitted image dots 1, 2 (or 1, 2 and 3) follows for reproducing a complete image. If, however, greater differences are present, then the last three or four image dots are scanned and evaluated anew. In this manner the processing speed in the system is increased.

Since apart from the absorption values, material values may also be determined by the detectors, it is feasible to provide for a material-dependent image optimization. In such a method the image dots are counted, scanned concerning a specific property and examined concerning their gray scale value, and the scanned zone is brightened.

BRIEF DESCRIPTION OF THE DRAWINGS

FIG. 3a illustrates a reproduction of an image on a monitor without image optimization.

FIG. 3b shows a reproduction of an image on a monitor with image optimization.

DESCRIPTION OF THE PREFERRED EMBODIMENTS

Figure 1:
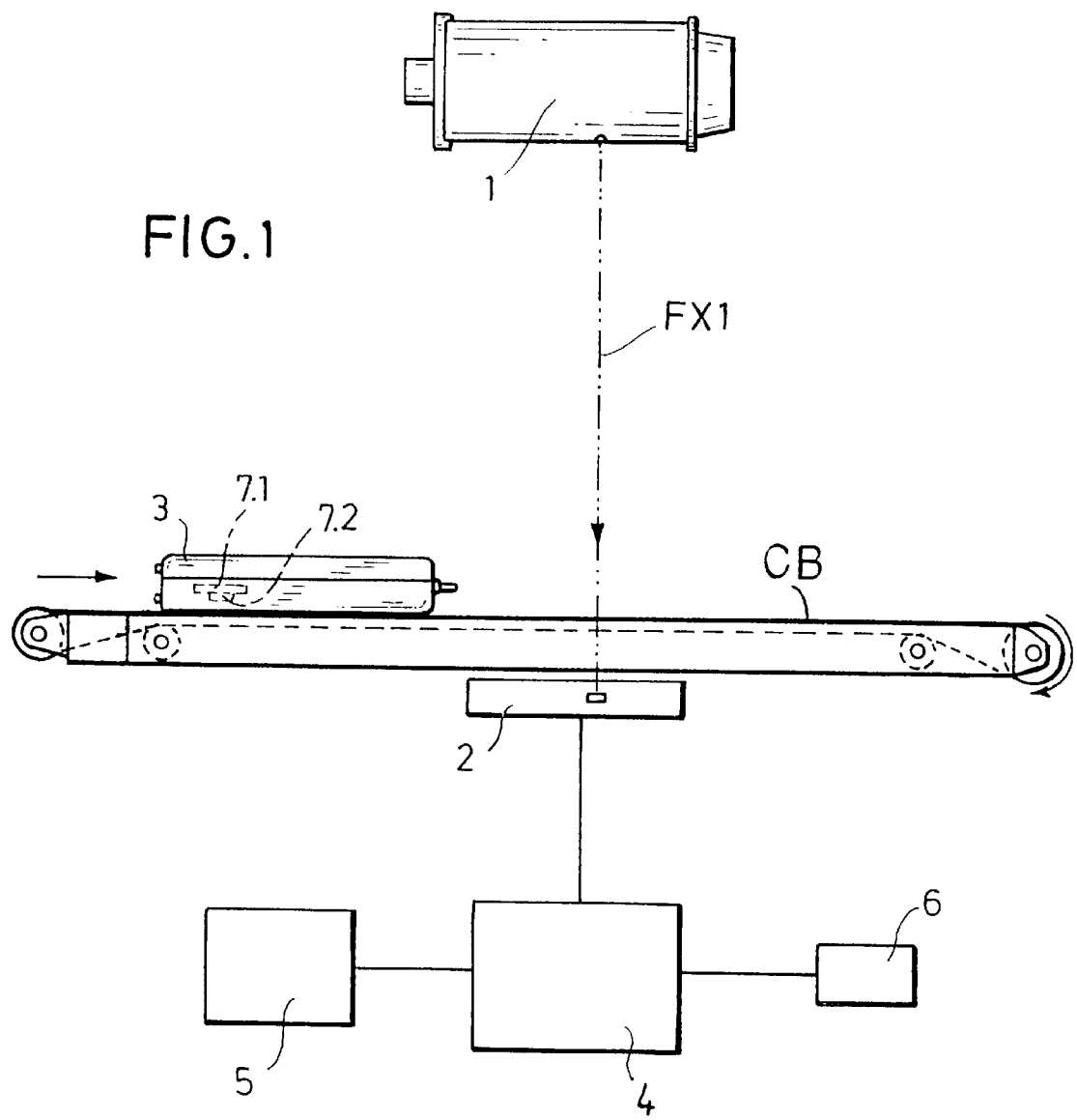
FIG. 1 is a schematic side elevational view with block diagram, illustrating a measuring system.

FIG. 1 shows a measuring apparatus including an X-ray generator 1 and a detector 2. An object 3, such as a piece of luggage is introduced by a conveyor belt CB between the X-ray generator 1 and the detector 2. The object 3 may contain a number of various articles 7.1, 7.2. In the shown representation the article 7.2 is entirely covered by the article 7.1 with respect to the incoming X-ray radiation FX1. A computer system 4 is coupled to the detector 2 by means of non-illustrated, conventional components. A display device, such as a monitor 5 and/or a printer 6 connected with the computer system 4 renders the measuring results visible.

Figure 2:
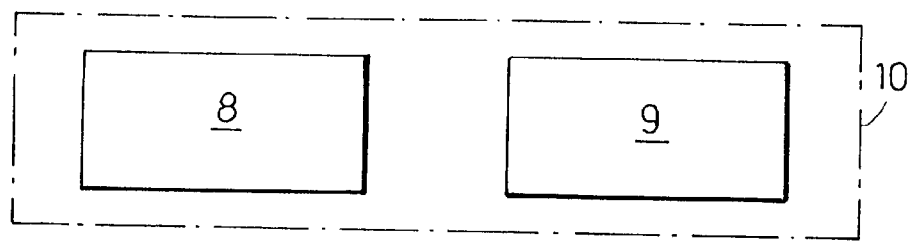
FIG. 2 is a block diagram illustrating a system for performing the optimizing process according to the invention.

FIG. 2 is a block diagram of the inner structure of the computer system 4. The detector 2 (not shown in FIG. 2) is connected with a region determining device 8 whose outputs are connected to a region optimizing device 9 whose output is coupled, for example, to the monitor 5 (not shown in FIG. 2).

The synchronization of the image data is performed, where necessary, by means of non-illustrated buffer memories. The individual structural groups are combined into an image optimizing unit 10.

In the description which follows, the image optimizing process of the above-described apparatus will be set forth.

The X-ray generating apparatus 1 directs an X-ray beam FX1 to the object 3 to be transilluminated. The X-rays are, by the absorption behavior of the materials of the items 7.1, 7.2 as well as by the housing material of the object 3 weakened and thereafter sensed by the detector 2. The detector 2 which may be, for example, a line camera formed of a plurality of X-ray detectors, emits signals representing the non-absorbed X-rays. The signals are, as image data information regarding the transilluminated object 3, applied to the computer system 4 for image processing. The inputting is performed preferably line-by-line and continuously. The image data are applied to the zone determining device 8 where the regions A are searched, for example, by means of comparison of the gray scale values of the image data with a gray scale threshold value. The zones may be determined by comparison of the individual image dots or by a combination of image dots. Zone sizes below a predetermined threshold are rejected.

At the same time, in the zone determining device 8 a suitable function for optimizing may be determined (for example, a gray scale value adaptation by means of a histogram equalization).

The image data and, if available, the optimizing function are transferred to the zone optimizing device 9 where the local image zone is optimized in accordance with the preselected optimizing function. Such an optimizing function may be either stored in the zone optimizing device 9 or may be dynamically loaded by zone determining device 8 into the zone optimizing device 9 dependent from the image data of that zone.

In the example shown in FIG. 3a the object 3 contains an item 7.1 which is highly absorbent of X-rays. The image data are applied line-by-line to the image zone determining device 8 where the image dots are scanned according to gray scale values.

The gray scale range of an X-ray image lies in practice between 0 and 4095. Ranges are considered to be bright above a gray scale value of 800 whereas ranges are considered to be dark below 800. Below a gray scale value of 200 a contrast-rich differentiation within the dark zones is no longer possible.

Since, as it may be seen in FIG. 3, in the region of the object 3 no substantially absorbing article is detected until the object 7.1 appears, such a zone is classified as a bright zone, and thus the image optimizing process need not be rendered effective in the system.

As the article 7.1 begins to be transilluminated, a gray scale value is determined which, for example, is less than 200. Such a gray scale value has been, for example, stored as a gray scale threshold in the zone determining device 8 and thus effects a surface determination of the article 7.1. For this purpose, neighboring image dots are counted and their gray scale value determined. In case such gray scale values are less than the set gray scale threshold value, a dark zone A is determined.

Thereafter the image optimization proper follows by expanding the gray scale values of the individual image dots to a higher image dot value in the zone optimizing device 9. This may be performed by an optimizing function look-up table, for example, a high-look-up table or by any other known algorithms. In such a proceeding, for example, the high-look-up table may have the following expansion values:

The gray scale value 0 remains 0; the gray scale values 12, 20 and 32 are raised (expanded), respectively, to an image dot value of 512, 768 and 2944 whereas the image dot value 4095 remains at the same magnitude. Thus, such a gray scale value increase (expansion) is non-linear.

By means of the expansion of the gray scale values in the selected zone A which is considered as a dark zone, a brightening of each image dot occurs, whereby a contrast-rich image reproduction in such a zone A is possible, as seen in FIG. 3b. FIG. 3a shows the same zone A without brightening. By brightening the dark zone A, it is possible to detect the article 7.2, because the article 7.2, within the same zone A, produces darker gray scales of the image dots due to its absorption property. The zones not detected by the zone detecting device 8 remain in their original brightness as the X-ray image is reproduced on the monitor 5 or by the printer 6. Only a local brightening of those parts of zone A occurs which are detected as dark.

Figure 4:
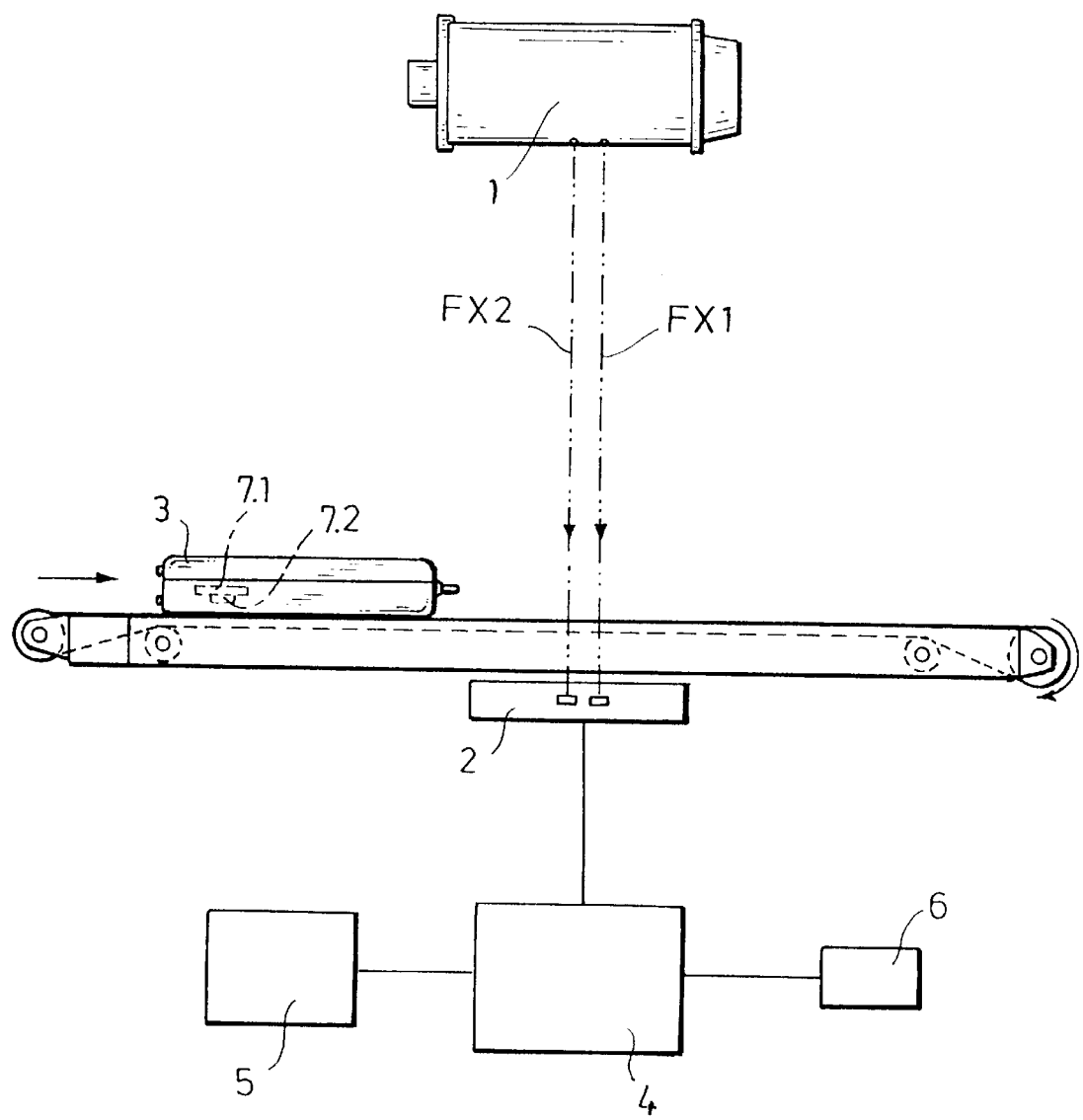
FIG. 4 is a schematic side elevational view with block diagram, illustrating a measuring system different from that shown in FIG. 1.

In addition to the evaluation of the gray scale properties of an image dot, an image optimization based on material properties of the image dot may also be performed. As shown in FIG. 4, for this purpose, for example, two X-ray beams FX1 and FX2, which are preferably integrated into the X-ray generating apparatus 1, are directed to the object 3 to be transilluminated. The X-ray beams FX1 and FX2 which have different energy ranges are weakened by the absorption behavior of the various materials of the articles 7.1 and 7.2 as well as the housing material of the object 3 and are sensed by the detector 2. With the aid of the two X-ray beams FX1 and FX2 the material of the individual articles 7.1. 7.2 may be detected and defined in a known manner.

It is, however, also possible to perform such a material detection with only a single X-ray beam FX1 and several serially arranged detectors of a detector assembly 2. If, for example, in the zone determining device 8 aluminum is set as the material to be optimized, the article 7.1, if it contains aluminum, is detected as region A. The image optimization is carried out thereafter by expanding the gray scale values in the zone optimizing device 9 as described above.

It is also feasible to determine a plurality of image zones A having different properties. In this manner different optimizing functions may be simultaneously used which are adapted to the different properties. The selected image zones A may be characterized additionally by frames, blinking frames or by blinking to distinguish between the original and the modified, optimized image zone A.

It is to be understood that variations within the inventive principle are feasible.

Thus, according to a variant of the inventive method, the number of image dots which are below a certain gray scale value, are determined not by the immediately adjoining image dots of such a gray scale value, but image dots are utilized which fall below a certain gray scale value and which are not immediately adjoining one another, but are, for example, separated by two or three image dots which lie above the predetermined gray scale threshold value. In this manner, blurry regions may be detected as well, in case they are traversed by a few bright image dots.

According to a further variant of the method, not each adjoining image dot is scanned and evaluated but only image dots separated by m image dots. In determining such a distance m, care has to be taken that it is not selected to be excessively large. It is of importance that a relatively small article 7.2 may be detected which is situated under (and thus hidden by) a relatively large article 7.1. Preferably, the distance m is composed of four image dots. If during the evaluation of a last-scanned image dot a gray scale value is determined which has a value equal to the previously determined image dot and thus also falls below the set gray scale threshold value, the image dot of the next remote neighbor is evaluated. If, however, the zone determining device 8 ascertains that the determined gray scale value is significantly greater than the last-scanned image dot and thus the gray scale threshold value is not understepped, the image dots situated in the last interval are again scanned and evaluated to determine the exact position of the article 7.1. Thereafter, either each image dot is again evaluated or the interval-wise image dot evaluation is utilized. In this manner, the processing speed may be increased.

The gray scale threshold set in the zone determining device 8 may be also be set in such a manner that the image optimizing process is coupled to the X-ray image evaluation if a detected gray scale value is equal to or greater than such a threshold value. Accordingly, in the zone optimizing device 9 other optimizing functions are to be applied. Such an image optimizing process is preferably used for a line-by-line image detection. It is, however, also possible to subsequently process and to optimize zonewise already stored X-ray images with such a method.

The method according to the invention is not limited to the localization of dark zones A. Brighter zones may be also be expanded; the set gray scale threshold may then be, for example, 1000.

It will be understood that the above description of the present invention is susceptible to various modifications, changes and adaptations, and the same are intended to be comprehended within the meaning and range of equivalents of the appended claims.

What is claimed is:
1. A method of optimizing an X-ray image representing an article transilluminated by X-rays, comprising the following steps:
   (a) detecting the X-rays leaving the article after transillumination thereof by the X-rays;
   (b) processing, in a computer, the detected X-rays as image dots to obtain an image;
   (c) applying the image dots to an image memory;
   (d) scanning the image dots according to gray scale values thereof;
   (e) comparing the scanned gray scale values with a desired threshold gray scale value;
   (f) upon finding, in performing step (e), an image dot which is other than said desired threshold gray scale value, counting subsequent image dots to obtain an image zone A;
   (g) determining the gray scale values of the image dots of said image zone A; and
   (h) expanding the gray scale values of the image dots of said image zone A to higher image dot values for effecting a local brightening of the X-ray image in said image zone A by the higher image dot values.

2. The method as defined in claim 1, further comprising the step of performing steps (g) and (h) only if, in performing step (f), a predetermined number of image dots in said image zone A was found to have a gray scale value other than said desired threshold gray scale value.

3. The method as defined in claim 2, wherein step (f) comprises the step of determining the number of image dots by counting immediately adjoining image dots while determining whether said immediately adjoining image dots fall below or exceed said desired threshold gray scale value.

4. The method as defined in claim 2, wherein step (f) comprises the step of determining the number of image dots by counting image dots located at a predetermined distance from one another while determining whether said image dots located at a predetermined distance from one another fall below or exceed said desired threshold gray scale value.

5. The method as defined in claim 2, wherein step (f) comprises the step of determining the number of image dots by counting individual image dots while determining whether said individual image dots fall below or exceed said desired threshold gray scale value and whether said individual image dots exceed a maximum distance from one another.

6. The method as defined in claim 1, further comprising the step of using pre-stored material-characteristic data from the image dots for determining the image zone A to be brightened.

7. The method as defined in claim 1, further comprising the steps of determining optimizing functions for said image zone A and storing said optimizing functions in an image optimizing device.

8. The method as defined in claim 1, further comprising the steps of simultaneously detecting a plurality of image zones A determined in step (f); optimizing said image zones A with unlike optimizing functions; and representing said image zones A in a brightened manner.

9. The method as defined in claim 1, further comprising the step of characterizing the selected image zones A by frames.

10. The method as defined in claim 1, further comprising the step of characterizing the selected image zones A by blinking frames.

11. The method as defined in claim 1, further comprising the step of characterizing the selected image zones A by blinking.

* * * * *